United States Patent Office 3,355,506
Patented Nov. 28, 1967

3,355,506
PROCESS FOR THE PREPARATION OF POLYCHLOROCYCLOHEXADIENES
Eugene P. Di Bella, Rochelle Park, and Adolph J. Deinet, Woodcliff Lake, N.J., assignors, by mesne assignments, to Tenneco Chemicals, Inc., a corporation of Delaware
No Drawing. Filed Mar. 5, 1962, Ser. No. 177,264
3 Claims. (Cl. 260—648)

This invention relates to herbicidal compositions and is particularly concerned with a composition and method for destroying aquatic vegetation. It further relates to new compounds that are useful as aquatic herbicides and to a method for their preparation.

It has been found that certain methyl polychlorocyclohexadienes have unusual and valuable properties as aquatic herbicides. These methyl polychlorocylohexadienes are toxic to a wide variety of plant species when these compounds or compositions containing these compounds are introduced into water adjacent to the submersed portions of the plants, but they are non-toxic to terrestrial plants and warm-blooded animals even in relatively large dosages. The methyl polychlorocyclohexadienes may be applied in very low concentrations so that significant residues of the herbicide are not obtained in the water after control is achieved. Compositions containing the methyl polychlorocyclohexadienes present no handling difficulties and may be applied directly to the area requiring treatment.

The novel herbicidal compounds of the present invention are methyl polychlorocylohexadienes which have the structural formula

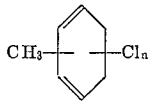

wherein $n$ represents a number in the range of 3 to 5. Illustrative of these compounds are 1-methyl-2,3,4-trichlorocylohexadine-1,5,
1-methyl-2,5,6-trichlorocyclohexadiene-1,3,
1-methyl-2,3,5,6-tetrachlorocyclohexadiene-1,3,
1-methyl-3,4,5,6-tetrachlorocyclohexadiene-1,3,
1-methyl-3,4,5,6-tetrachlorocyclohexadiene-1,5,
1-methyl-2,3,4,5,6-pentachlorocyclohexadiene-1,3, and
1-methyl-2,3,4,5,6-pentachlorocyclohexadiene-1,5.

The preferred compounds for use in herbicidal compositions are those having at least one chlorine atom in the ring position adjacent to the methyl group. While a single methyl polychlorocyclohexadiene may be used to control the growth of aquatic vegetation, it is generally preferred to use mixtures comprising two or more of these compounds. The methyl polychlorocyclohexadienes are soluble in such organic solvents as acetone, methy ethyl ketone, alcohols, benzene, toluene, and xylene and substantially insoluble in water.

The novel compounds of the present invention may be prepared by any convenient procedure. For example, they may be prepared by chlorinating toluene under conditions that favor addition chlorination until the desired degree of chlorination has been attained. The resulting product, which is a mixture comprising methyl polychlorocyclohexadienes, may be used without purification or separation of the components in the control of aquatic vegetation.

In order to obtain a maximum yield of the desired methyl polychlorocyclohexadienes, the addition chlorination of toluene is carried out at a temperature between approximately 0° C. and 40° C. and preferably between 10° C. and 20° C. At temperatures above 40° C. little addition chlorination takes place, and the products formed are principally chlorotoluenes and/or chlorobenzyl chlorides.

Any of the catalysts that promote the addition chlorination of aromatic compounds may be used in the practice of the present invention. The preferred addition chlorination catalysts include germanium tetrachloride, iodine, powdered boron, and such tertiary amines as pyridine, ethylpyridine, picolines, lutidenes, collidines, triethylamine, triphenylamine, and N,N-dimethylaniline. A single addition chlorination catalyst or a mixture of two or more of these catalysts may be used in the process of the present invention.

Germanium tetrachloride is particularly preferred as the catalyst for the first stage of the addition chlorination of toluene because it provides an intermediate mixture containing a maximum amount of addition compounds. Further chlorination of this intermediate mixture yields a product consisting principally of methyl polychlorocyclohexadienes.

Since the effectiveness of germanium tetrachloride as a chlorination catalyst diminishes after approximately one gram atom of chlorine has been added per mole of toluene, its is generally necessary to use another addition chlorination catalyst in the second stage of the chlorination. Iodine is preferably used for this chlorination step since it provides a high yield of methyl polychlorocyclohexadienes. Indium trichloride and other addition chlorination catalysts may also be used in the second stage of the chlorination. They are less satisfactory in this reaction than is iodine, however, since their use leads to the formation of some side-chain chlorinated products. Activated carbon may also be present during the addition chlorination of toluence since it absorbs chlorine and thereby increases the efficiency and the rate of the chlorination as well as serving as a secondary addition chlorination catalyst.

The amount of catalyst used in the chlorination of toluene is not critical. In most cases approximately 0.05% to 3%, based on the weight of toluene, of a single catalyst or a mixture of catalysts is used.

In a preferred embodiment of this invention, toluene is chlorinated at 0°–40° C. in the presence of a germanium chloride catalyst until analysis or determination of weight increase indicates that approximately 1.0 to 1.8 gram atoms of chlorine has been added per mole of toluene. A second addition chlorination catalyst, such as iodine, is then added, and the chlorination is continued until the product contains an average of approximately 3 to 5 gram atoms of chlorine per mole of tolene originally charged.

Alternatively, the chlorination may be carried out as a one-step process using iodine as the addition chlorination catalyst and continuing the chlorination until 3 to 5 gram atoms of chlorine has reacted per mole of toluene charged.

The products obtained from the aforementioned addition chlorination reactions are mixtures of chlorinated toluenes that contain 30% by weight or more of methyl polychlorocyclohexadienes, the remainder being made up principally of chlorotoluenes and side-chain chlorinated compounds. These mixtures have been found to be effective in controlling the growth of a wide variety of aquatic plants. The preferred products for use as aquatic herbicides are those that contain approximately 40% to 90% by weight of methyl polychlorocyclohexadienes.

A single methyl polychlorocyclohexadiene or a mixture of these compounds may if desired be separated from the other products of the addition chlorinations. Such products provide excellent control of aquatic vegetation, but may be costly to prepare.

In order to control the growth of aquatic vegetation, it is necessary to provide a toxic dosage of methyl polychlorocyclohexadiene in the water adjacent to the plants for a time sufficient to kill the plants. In general good results are obtained when the herbicidal compounds are distributed in water adjacent to growing aquatic plants in the amount of 1 part to 200 parts or more by weight per million parts by weight of water. The exact dosage to be employed is dependent on the nature of the plant growth and on whether the treatment is carried out in moving water, such as a canal, or in standing water, such as a pond. In standing water, effective control of plant growth may be obtained with as little as 1 to 50 parts of the herbicide per million parts of water; in moving streams, higher dosages are required in order to contact the plants with a phytotoxic amount of methyl polychlorocyclohexadiene.

The method of the present invention may be carried out by introducing a phytotoxic amount of methyl polychlorocyclohexadiene or of a composition containing methyl polychlorocyclohexadiene as an active ingredient into the water adjacent to the submersed growing plants.

While the methyl polychlorocyclohexadienes may be applied as such to the aquatic plants to control their growth, it is generally preferred to apply them in the form of a composition which contains one or more of the well-known herbicide adjuvants. For example, the compositons may contain organic solvents, such as acetone, benzene, toluene, or xylene; surface-active dispersing agents, such as alkyl aryl sulfonates, alkali metal salts of sulfated fatty alcohols, or alkylene oxide condensation products of alkylphenols, tall oil, or higher alkyl mercaptans; and finely divided inert solids, such as talc, fuller's earth, diatomaceous earth, bentonite, and the like. The herbicidal compounds are preferably applied in the form of emulsifiable liquid concentrates or wettable powder concentrates. Such concentrates may be readily and conveniently distributed in water adjacent to submersed plants to provide in the water phytotoxic concentrations of methyl polychlorocyclohexadiene.

The concentration of the herbicidal compound in the compositions is not critical and may vary widely provided that the required dosage is introduced into the water adjacent to the plants. In most cases the compositions contain 0.01% to 95% by weight of the herbicidal compound. The preferred compositions contain approximately 0.1% to 10% by weight of methyl polychlorocyclohexadiene. If desired, the compositions may contain other herbicidal compounds in addition to the methyl polychlorocyclohexadienes. The compositions preferably have a density only slightly greater than that of water.

In the practice of the present invention a phytotoxic amount of methyl polychlorocyclohexadiene is introduced into the water adjacent to the submersed portions of the plants in a pond, lake, stream, canal, river, or other watercourse. This may be accomplished, for example, by sprinkling or spraying the composition onto the surface of the water or beneath the surface of the water above a plant mass so as to permit its dispersion in the water adjacent to the plant. In moving watercourses the herbicide is introduced into the water in such a manner that it is distributed into and over the plant growth area for a sufficient exposure time to kill the plants.

The invention is further illustrated by the examples that follow. It is to be understood, however, that these examples are not to be construed as being limitative, but are furnished merely for the purpose of illustration.

Example 1

A mixture of 368 grams (4.0 moles) of toluene, 4 grams of germanium tetrachloride, and 4 grams of activated carbon was contacted with chlorine at 10°–15° C. until the weight of the reaction mixture had increased by 143 grams. Then 1 gram of iodine was added, and the chlorination was continued until the weight of the reaction mixture had increased by an additional 415 grams. During the chlorination approximately 4.0 gram atoms of chlorine was added per mole of toluene.

The reaction mixture was air-blown to eliminate excess hydrogen chloride and then washed with aqueous sodium bisulfite solution to remove the iodine. It was then washed with water and filtered. There was obtained 915 grams of a liquid product that had a total chlorine content of 60.4% and a labile chlorine content of 12.0% (calculated for $C_7H_6Cl_4$: total chlorine, 61.1%; labile chlorine, 15.3%).

Then a sample of the product was dehydrochlorinated by pyrolysis at approximately 180° C. to give a mixture having the following composition:

| | Weight percent | Molar percent |
|---|---|---|
| Dichlorotoluene | 3.3 | 4.0 |
| 2,3,6-trichlorotoluene | 32.0 | 32.3 |
| 2,4,5-trichlorotoluene | 40.9 | 41.4 |
| 2,3,4-trichlorotoluene | 11.5 | 11.6 |
| 2,3,5,6-tetrachlorotoluene | 9.0 | 7.8 |
| 2,3,4,5-tetrachlorotoluene | 3.3 | 2.9 |

From the foregoing analyses of the product before and after dehydrochlorination, it was determined that the product contained 3.5% of methyl trichlorocyclohexadienes, 75.1% of methyl tetrachlorocyclohexadienes, and 9.4% of methyl pentachlorohexadienes.

Example 2

A mixture of 370 grams (4.0 moles) of toluene and 2 grams of iodine was contacted with chlorine at 15°–20° C. until the weight of the reaction mixture had increased by 420 grams (2.97 gram atoms of chlorine per mole of toluene). The reaction mixture was washed with dilute sodium hydroxide solution and then with water. The product had a total chlorine content of 54%.

A sample of the product was dehydrochlorinated by pyrolysis at approximately 180° C. to give a mixture having the following composition:

| | Weight percent |
|---|---|
| Dichlorotoluene | 61.6 |
| 2,3,6-trichlorotoluene | 11.5 |
| 2,4,5-trichlorotoluene | 15.6 |
| 2,3,4-trichlorotoluene | 6.6 |
| Tetrachlorotoluenes | 2.3 |
| Other compounds | 2.4 |

From the foregoing analyses it was determined that the product contained 63% of methyl polychlorocyclohexadienes, principally of methyl trichlorocyclohexadienes.

Example 3

A mixture of 370 grams (4.0 moles) of toluene and 20 grams of iodine was contacted with chlorine at 15°–20° C. until the weight of the reaction mixture had increased by 576 grams (4.15 gram atoms of chlorine per mole of toluene). The product was washed with water, with aqueous sodium bisulfite solution, and then again with water. There was obtained 923 grams of a product that had a total chlorine content of 60.4% and a side-chain chlorine content of 6.2%.

A sample of the product was dehydrochlorinated by heating it with methanolic potassium hydroxide for two hours at the reflux temperature of the mixture. The chlorotoluene layer was separated and was washed with water until neutral. This material, which had a total chlorine content of 59.1% and a side-chain chlorine content of 0.4%, was found by gas chromatographic analysis to have the following composition:

| | Weight percent |
|---|---|
| Dichlorotoluene | 0.3 |
| 2,4,6-trichlorotoluene | 0.5 |
| 2,3,6-trichlorotoluene | 7.4 |
| 2,4,5-trichlorotoluene | 35.7 |
| 2,3,4-trichlorotoluene | 0.4 |
| 2,3,5,6-tetrachlorotoluene | 38.5 |
| 2,3,4,5-tetrachlorotoluene | 17.2 |

From the foregoing analyses of the product before and after dehydrochlorination, it was determined that the product contained 44% of methyl polychlorocyclohexadienes, principally methyl pentachlorocyclohexadienes.

Example 4

A water-dispersible liquid concentrate was prepared by dissolving 1% by weight of the product of Example 1 in acetone which contained a surface-active dispersing agent. This concentrate was used for the treatment of Pithophora sp. *Najas Guadulapensis, Potamogeton diversifolius, Heteranthera dubia,* and *Anacharis Canadensis,* which had been grown for a period of five weeks in water in a series of small tanks. In the tests, the concentrate was poured into the tanks to expose the plants to concentrations of 5 and 100 parts by weight of methyl polychlorocyclohexadiene per million parts of water. For comparative purposes a similar series of tests was carried out in which tetrachlorotoluene was the herbicidal compound. Following this treatment the plant cultures were observed at regular intervals to determine the degree of growth control that had been obtained. Three weeks after treatment with the herbicidal compositions the observation showed the controls of plant growth as set forth in the following table:

| Plant Species | Percent of Plants Killed | | | |
|---|---|---|---|---|
| | Methyl polychlorocyclohexadiene (Product of Ex. 1) | | Tetrachlorotoluene | |
| | 5 p.p.m. | 100 p.p.m. | 5 p.p.m. | 100 p.p.m. |
| Pithophora sp | 90 | 100 | 77 | 100 |
| Najas guadulapensis | 100 | 100 | 95 | 100 |
| Potamogeton diversifolius | 100 | 100 | 95 | 100 |
| Heteranthera dubia | 95 | 100 | 100 | 100 |
| Anacharis canadensis | 100 | 100 | 93 | 100 |
| Average for 5 plant species | 97 | 100 | 92 | 100 |

From the data in the table it will be seen that methyl polychlorocyclohexadiene is effective in controlling the growth of a variety of aquatic plant species. At low concentrations it is appreciably more effective as an aquatic herbicide than tetrachlorotoluene.

The foregoing description of the present invention has been limited to the addition chlorination of toluene and to the use of the resulting methyl polychlorocyclohexadienes as aquatic herbicides. It is to be understood, however, that other substituted benzenes, such as those having other alkyl substituents or hydroxy, alkoxy, nitro, amino, or halogen substituents may also be chlorinated by the novel chlorination procedure to form addition chlorination compounds that are useful as aquatic herbicides.

What is claimed is:

1. The process which comprises the steps of contacting toluene with chlorine at a temperature between approximately 0° C. and 40° C. in the presence of a germanium tetrachloride catalyst until at least 1.0 gram atom of chlorine has been added per mole of toluene, adding to the reaction mixture a catalyst selected from the group consisting of iodine and indium trichloride, and continuing the chlorination until a total of at least 3.0 gram atoms of chlorine has reacted per mole of toluene thereby forming methyl polychlorocyclohexadiene.

2. The process which comprises the steps of contacting toluene with chlorine at a temperature between approximately 10° C. and 20° C. in the presence of a germanium tetrachloride catalyst until approximately 1.0 gram atom to 1.8 gram atoms of chlorine has been added per mole of toluene, adding a catalytic amount of iodine to the reaction mixture, and continuing the chlorination until a total of at least 3 gram atoms of chlorine has reacted per mole of toluene thereby forming methyl polychlorocyclohexadiene.

3. The process which comprises the steps of contacting toluene with chlorine at a temperature between approximately 10° C. and 20° C. in the presence of a catalytic amount of germanium tetrachloride until approximately 1 gram atom to 1.8 gram atoms of chlorine has been added per mole of toluene, adding a catalytic amount of iodine to the reaction mixture, and continuing the chlorination until an additional 3 gram atoms of chlorine has reacted per mole of toluene thereby forming methyl tetrachlorocyclohexadiene.

References Cited
UNITED STATES PATENTS

| | | |
|---|---|---|
| 2,010,841 | 8/1935 | Bender. |
| 2,573,344 | 10/1951 | Galitzenstein et al. _ 260—648 X |
| 2,732,409 | 1/1956 | Ladd _____ 260—648 |
| 2,744,940 | 5/1956 | Pines _____ 260—648 |
| 2,860,161 | 11/1958 | Schmerling et al. __ 260—648 X |
| 3,063,821 | 11/1962 | Weil _____ 71—2.3 |
| 3,070,431 | 12/1962 | Miller _____ 71—2.3 |
| 3,150,194 | 9/1964 | Kolka et al. _____ 260—648 |

LEON ZITVER, *Primary Examiner.*

JULIAN S. LEVITT, *Examiner.*

J. O. THOMAS, K. H. JOHNSON, K. V. ROCKEY, M. JACOB, *Assistant Examiners.*